United States Patent [19]

Bargerhuff et al.

[11] Patent Number: 5,563,871
[45] Date of Patent: Oct. 8, 1996

[54] ROTARY ACTUATOR WITH A MAGNETIC BIAS BEARING CONFIGURATION FOR ROTATING AN OPTICAL ELEMENT IN AN OPTICAL DATA STORAGE SYSTEM

[75] Inventors: Richard A. Bargerhuff, Austin, Tex.; Edwin R. Childers, Tucson, Ariz.; Rudolf W. Lissner, San Jose, Calif.

[73] Assignee: International Business Machines Corporation., Armonk, N.Y.

[21] Appl. No.: 484,033

[22] Filed: Jun. 7, 1995

Related U.S. Application Data

[63] Continuation of Ser. No. 149,578, Nov. 9, 1993, abandoned.

[51] Int. Cl.⁶ .......................... G11B 7/095; G11B 7/135; G02B 26/08; H02K 1/17
[52] U.S. Cl. .................. 369/119; 369/44.17; 359/225; 310/36
[58] Field of Search ................... 369/244, 44.14, 369/44.17, 44.19, 44.22, 112, 119; 359/223–226, 214, 814, 824–825; 310/36, 156; 318/128; 335/272, 281, 288, 296, 302

[56] References Cited

U.S. PATENT DOCUMENTS

| | | | |
|---|---|---|---|
| 3,794,868 | 2/1974 | Haigh | 310/36 |
| 4,560,925 | 12/1985 | Niven et al. | 359/225 |
| 4,658,390 | 4/1987 | Fujii et al. | |
| 4,703,293 | 10/1987 | Ono et al. | 335/80 |
| 4,720,185 | 1/1988 | Kurihara | |
| 4,792,935 | 12/1988 | Kime et al. | 369/45 |
| 4,799,766 | 1/1989 | Estes | |
| 4,845,699 | 7/1989 | Kawasaki et al. | |
| 4,905,031 | 2/1990 | Mody | |
| 4,984,226 | 1/1991 | Kobori | |
| 5,041,935 | 8/1991 | Aruga et al. | 360/106 |
| 5,062,095 | 10/1991 | Horikawa et al. | |
| 5,097,361 | 3/1992 | Childers et al. | |
| 5,105,408 | 4/1992 | Lee et al. | 369/44.15 |
| 5,243,241 | 9/1993 | Wang | 310/36 |

FOREIGN PATENT DOCUMENTS

| | | |
|---|---|---|
| 0341820A2 | 11/1989 | European Pat. Off. |
| 2-76135 | 3/1990 | Japan |
| 2-265031 | 10/1990 | Japan |

OTHER PUBLICATIONS

"Focus And Tracking Apparatus For Optical Disks", IBM Technical Disclosure Bulletin, vol. 33, No. 10A, New York, U.S., Mar., 1991, pp. 360–361.

*Primary Examiner*—Stuart S. Levy
*Assistant Examiner*—Brian E. Miller
*Attorney, Agent, or Firm*—Douglas R. Millett; Andrew J. Dillon

[57] ABSTRACT

A rotary actuator utilizing a magnetically biased bearing. A magnetized rotor is held in close proximity to a ferromagnetic mount. The magnetic flux created by the magnetic rotor through the ferromagnetic mount creates a magnetic bias force on the rotor bearing surface. The rotary actuator with the magnetically biased bearing rotates a mounted mirror to direct a reading laser beam to act as a fine tracking actuator within an optical data storage system.

28 Claims, 5 Drawing Sheets

ROTARY ACTUATOR WITH A MAGNETIC BIAS BEARING CONFIGURATION FOR ROTATING AN OPTICAL ELEMENT IN AN OPTICAL DATA STORAGE SYSTEM

This is a continuation of application Ser. No. 08/149,578, filed Nov. 9, 1993, now abandoned.

BACKGROUND OF THE INVENTION

1. Field of the Invention

The present invention relates in general to rotary actuators and in particular to a fine tracking rotary actuator in an optical disk drive system utilizing a magnetically biased bearing.

2. Description of the Prior Art

The typical optical data storage system reads and writes information to an optical disk. The optical disk is rotated at a relatively high rate of speed and a light source such as a laser beam is focused on one of a plurality of data tracks on the disk. The light is modulated or interrupted as a function of the recorded information and the modulated beam is utilized to reconstruct the recorded information. One important property of such a recording scheme is the ability to have a large number of tracks positioned closely adjacent to each other on the disk, resulting in the width of each track and the space between successive tracks being very narrow. The light spot must be maintained as a focused spot, and if the light spot is not maintained in alignment over the track being read or recorded upon, an error will be produced.

Multiple actuators which drive mirrors, lenses, and prisms are used to acquire fine positional control over the laser beam in directing it onto a data track. Mechanical positioning of the optical head carriage containing the primary mirror and lens actuators generally results in coarse track positioning in a regional section of the disk. Fine or individual track selection is accomplished through manipulation of optical element actuators. The fine tracking system includes means such as a mirror for changing the local angle of incidence of the laser beam along the optical path from the beam control unit which creates the beam to the focusing element in the carriage head in order to shift the focus spot laterally (i.e., radially). Fine rotary actuators allow precise control of the mirror in the radial direction relative to the data disk. Such radial control enables the system to accurately follow a data track on the disk or to switch to adjacent data tracks.

Because of extremely high track density and lineal recording densities in optical disk recorders, the slightest nonuniformity or play in the pivoting of the rotary actuator can introduce vibrational errors, misalignment errors, and dynamic errors. These errors become independent variables which have to be compensated for in aligning the laser beam as it reads the optical disk. These errors become significant in actuator alignment and operation at track spacings of about one micron and with a substantial linear density in which the cells are a micron or less in length along the track. Tracking errors occur from electronic errors in the track and seek servo controller controlling the optical elements directing the laser beam reading the disk. More significant are mechanical errors produced by wobbling and bouncing of optical elements. With the fine tracking rotary actuator loose toleranced bearings can create such wobbling and bouncing, resulting in large variations in the actuator's true angle and position and an imprecise alignment of the actuator's optical element. Standard shim and ball bearings which have significant play due to normal wear, product defects, and manufacturing variations are not well suited for the miniature and precise requirements of optical disk recording systems.

The same problems occur in hard disk recorders in which the magnetic transducer is rotatably mounted for track crossings and for track seekings. The high track densities of hard disks makes them susceptible to alignment and tracking errors created by loose tolerances in rotatable actuator bearings.

The prior art has made advances in creating higher tolerance bearings, but at the level of accuracy required for optical disk storage systems such bearings are costly to make, difficult to assemble, and easily malfunction. Accordingly, it has been desirable to provide a simple and accurate control of an optical disk rotary actuator at a high level of rotational tolerance.

One particular method of creating higher tolerance bearings for fine rotary actuators has been to create a magnetic bias force to firmly hold the rotating component of the rotary actuator against the actuator bearings. This magnetic bias force maintains a constant pressure against the bearings regardless of the rotational position of the actuator. Thus, the rotating component remains in a highly toleranced position with the bearings.

The prior art has created this magnetic bias force by inducing an electromagnetic field in the actuator. Such a device was created in Pat. No. 5,097,361. The rotating component has a magnet attached on each side. An electrical coil is placed in close proximity to each magnet. When current flows through each coil in the same direction, an electromagnetic force forces the magnets and rotating component in the same direction. The rotating component has a pivot point which is forced against a bearing surface by this electromagnetic force. This holds the rotating component in tight contact with the bearing surface.

In order to rotate the component, a differential in the coil currents is created. This changes the strength of the magnetic fields, produces unequal forces on the ends of the rotating component, and forces the component to rotate. In summary, large currents sent through both coils holds the component in high tolerance with the bearing surface. Rotation is achieved by slightly varying the magnitude of current through each coil.

Although this method achieves the high tolerance rotation desired, there are significant difficulties with the method. First, the high currents required to create the magnetic bias force consumes significant levels of power. It would be desirable to create a method which can create the advantages of a magnetic bias force without such a high consumption of power. Second, because of the high levels of current required to maintain the magnetic bias force, accurately controlling the variations in those currents in order to rotate the actuator is less precise. It would be desirable to create a method of magnetic bias force in which all the current going to the coils was used to rotate the actuator. This would allow low levels of current to be used which is much easier to precisely control. Moreover, during high frequency operation when the actuator is changing direction at very high speeds and rates of acceleration, the high currents degrade performance.

SUMMARY OF THE INVENTION

It is therefore one object of the present invention to provide improved seek and track performance for a fine track positioning system used in optical data storage devices.

It is another object of the present invention to provide an improved rotary actuator used in optical data storage systems.

It is yet another object of the present invention to provide an improved magnetically biased bearing for fine positioning of a rotary actuator.

According to the present invention, the foregoing and other objects are attained by a rotary actuator utilizing a magnetically biased bearing. In accordance with one aspect of the invention, a magnetized rotor is held in close proximity to a ferromagnetic mount. The magnetic flux created by the magnetic rotor through the ferromagnetic mount creates a magnetic bias force on the rotor bearing surface.

In accordance with another aspect of the invention, the rotary actuator with the magnetically biased bearing acts as a fine tracking actuator within an optical data storage system. The fine tracking actuator rotates a mounted mirror to direct a reading laser beam to a data track on an optical disk.

The above as well as additional objects, features, and advantages of the present invention will become apparent in the following detailed written description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
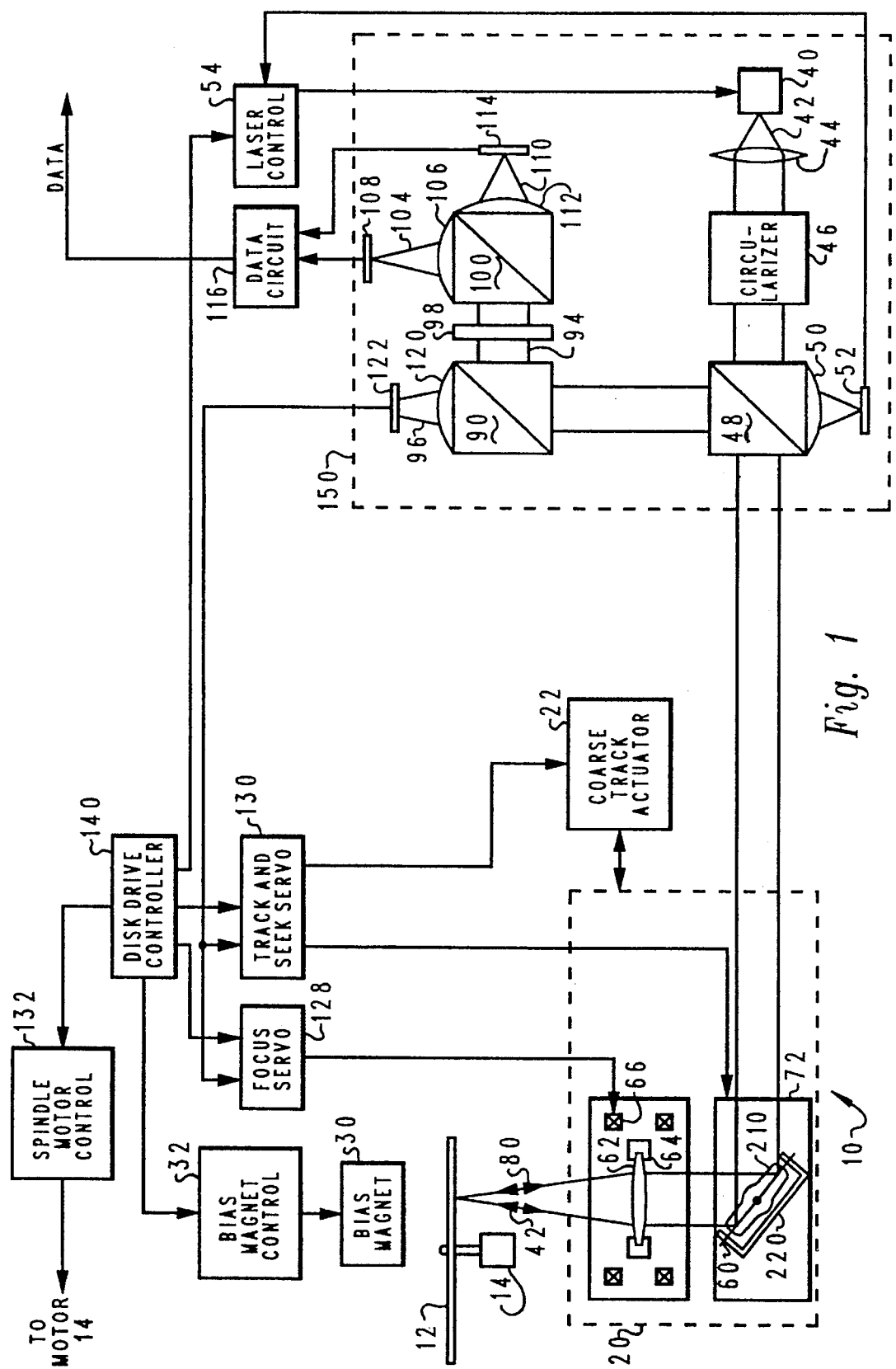
FIG. 1 is a pictorial representation of the optical disk drive of the present invention.

With reference now to the figures and in particular with reference to FIG. 1, there is depicted a schematic diagram of optical disk drive system 10 of the present invention. System 10 has optical data stored in optical medium disk 12 which is typically a disk having concentric or spiral data tracks. Disk 12 is mounted to a spindle motor 14. An optical head 20 is positioned below disk 12 and is moved in a radial direction relative to disk 12 by a course track actuator 22. A bias magnet 30 is located above disk 12 and is connected to a magnet control 32.

A laser 40, which may be a laser diode, produces a polarized light beam 42. One example of such a laser diode is a gallium-aluminum-arsenide laser diode which generates light at approximately 780 nm in wavelength. Light beam 42 is collimated by a lens 44 and circularized by a circularizer 46. Circularizer 46 is preferably a prism.

Beam 42 passes to a beam splitter 48. A portion of beam 42 is reflected towards a lens 50. Lens 50 focuses a light to a power monitor optical detector 52. Detector 52 is connected to a laser control 54. Detector 52 provides laser control 54 with a monitor power signal which is used to adjust the power of laser 40 as appropriate.

The remaining portion of beam 42 passes through beam splitter 48 to a mirror 60. Mirror 60 is mounted to fine track actuator 72, which comprises rotor 210 and rotor mount 220. Fine track actuator 72 rotates mirror 60 small distances, which in turn moves light beam 42 in a radial direction on the surface of disk 12 for purposes of maintaining light beam 42 on the proper track position on disk 12. Mirror 60 reflects the light toward an objective lens 62. Lens 62 is mounted in a lens holder 64, which may be held laterally to disk 12 by focus actuator 66 in order to focus light beam 42 on the proper track position on disk 12.

A light beam 80 is reflected from the disk 12, passes through lens 62 and is reflected by mirror 60. A portion of the light beam 80 is then reflected by beam splitter 48 to a beam splitter 90. Beam splitter 90 divides the beam 80 into a data beam 94 and a servo beam 96.

Data beam 94 passes through a half waveplate 98 to a polarizing beam splitter 100. Beam splitter 100 divides beam 94 into two orthogonal polarization components. A first polarization component beam 104 is focussed by a lens 106 to a data optical detector 108. A second polarization component beam 110 is focussed by a lens 112 to a data optical detector 114. A data circuit 116 is connected to detectors 108 and 114, and generates a data signal responsive to the differences in the amount of light detected at detectors 108 and 114 which is representative of the data recorded on disk 12.

Servo beam 96 is focussed by a lens 120 onto a segmented optical detector 122, such as a spot size measuring detector as is known in the art. A focus servo 128, as is known in the art, is connected to detector 122 and motor 66. Servo 128 controls motor 66 to adjust the position of lens 62 as appropriate in order to maintain proper focus. A track and seek servo 130, as is known in the art, is connected to detector 122 and actuators 22 and 72. Servo 130 causes actuator 22 to adjust the position of head 20 as appropriate to seek desired tracks on disk 12, and causes actuator 72 to rotate mirror 60 as appropriate to maintain proper tracking position once the appropriate track is reached. A spindle motor control 132, as is known in the art, is connected to motor 14. A disk drive controller 140, as is known in the art, provides overall control for servo 128 and 130, as well as spindle motor 14, laser control 54 and magnet control 32.

A fixed optical element (FOE) system 150 comprises laser 40, lens 44, circularizer 46, beam splitter 48, lens 50, detector 52, beam splitter 90, waveplate 98, beam splitter 100, lenses 106, 112, 120 and detectors 108, 114 and 122.

The writing and reading operations of system 10 may now be understood. During the write operation, controller 140 causes laser control 54 to energize laser 40 to provide a high power polarized beam 42. Beam 42 is powerful enough to heat a spot on the disk 12 to a temperature above its Curie temperature. The Curie temperature is the temperature at which the magnetic domain of the heated spot may be magnetically oriented. Controller 140 causes magnet control 32 to energize magnet 30. The magnetic domains of the heated spots are then oriented in the same direction as the magnetic field generated by the bias magnet 30. The laser 40 is pulsed responsive to the data to be recorded on the disk. The result is that data is recorded on the disk as spots having an up or down magnetic orientation.

During a read operation, controller 140 causes laser control 54 to energize laser 40 to generate a low power polarized beam 42 which is not powerful enough to heat the disk 12 above its Curie temperature. The reflected light 80 has its plane of polarization rotated one way or the other depending upon the magnetic domain orientations of the spots on the disk 12. This is known as the Kerr effect. These differences in polarization are detected by detectors 108 and 114, and data circuit 116 outputs a digitized data signal representative of the recorded data.

Although this description has detailed a read and write optical data storage system, those skilled in the art will appreciate that many systems will be read only, having no write capability, but that the present invention is directly applicable to these systems also.

Figure 2:
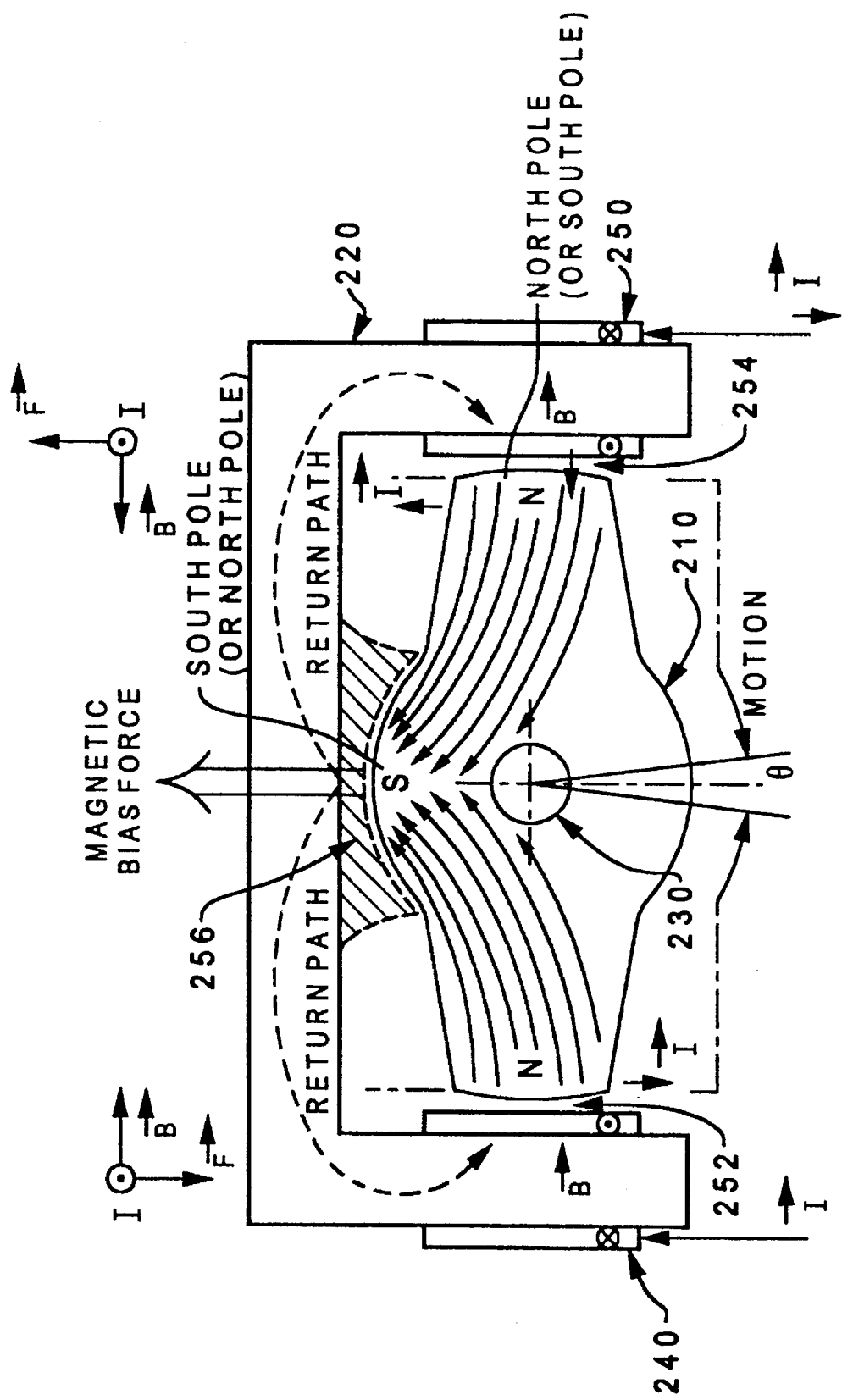
FIG. 2 shows a cut-away front view of the rotary actuator of the present invention.

FIG. 2, in a cut-away view through the center of the rotary actuator of the present invention, shows magnetized rotor 210 loaded in ferromagnetic rotor mount 220. Rotor mount 220 is formed as a single piece and is made of a ferromagnetic material such as low carbon steel or silicon steel or ferrite. Rotor 210 is a single piece polarized permanent magnet containing a north pole on each armature and a south pole at the top of rotor 210. This magnetization of rotor 210 creates working gap flux to rotor mount 220. A magnetic circuit is created as the magnetic flux travels from the north poles through the working gaps 252 and 254, where a working gap is defined as the air gap between two elements of a magnetic circuit, and through the return path created in rotor mount 220 to the south poles. The return path to the south pole creates the bias or attractive force.

In order to act as a return path for the magnetic flux, rotor mount 220 must be made of a ferromagnetic material or ferrite. This return path material and the rotor 210 material can be selected to satisfy the specific performance requirements of the rotary actuator. Low carbon steel can be used for the rotor mount if high bandwidth is not a requirement. Silicon steel or ferrite can be used to lower apparent coil inductance for improved bandwidth.

An attractive force or bias force between rotor 210 and rotor mount 220 is created by the magnetic flux between them. The attractive force produces a constant bias force on pivot 230 forcing it against a bearing surface formed within rotor mount 220 or on fine tracking rotary actuator 72. (Shown in FIG. 1.) This constant bias force prevents slipping, wobbling, or vibrations from effecting the rotational orientation of rotor 210 as occurs with traditional bearings in rotary actuators. Pivot 230 can be press fit into rotor 210 where it can be formed as part of the rotor.

Figure 3A:
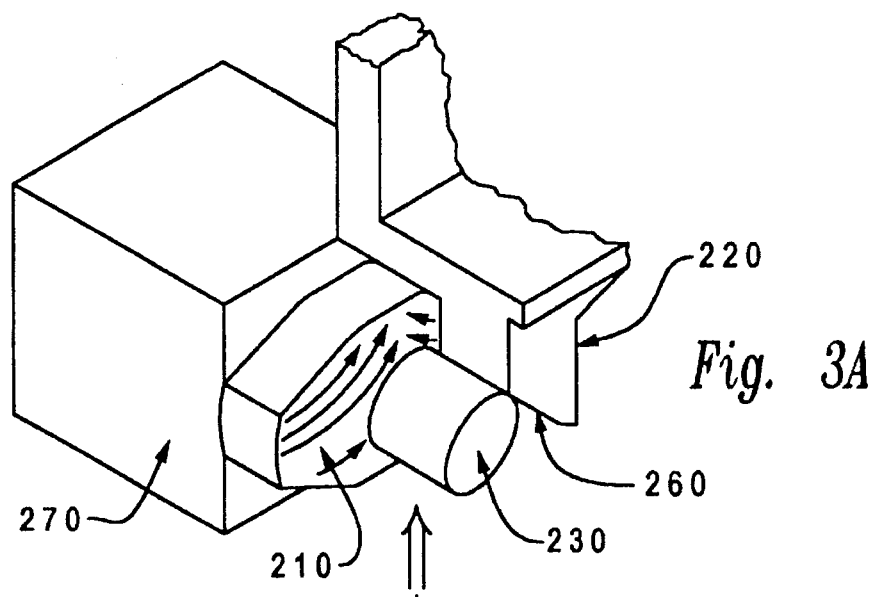
FIG. 3A depicts the rotary actuator of the present invention carrying a payload and including a partial cutaway of a mount.

FIG. 3A shows a partial cutaway side view of the rotary actuator of the present invention. Rotor 210 is carrying a payload 270 which has been mounted to its front face. Payload 270 can be one of any number of elements which require limited rotary motion such as, for example, a fine tracking prism or mirror in a magneto-optic disk drive. It will be appreciated by those skilled in the art that the rotary actuator of the present invention could be used to mechanically actuate any number of possible payloads, or it can be utilized with system applications beyond optical tracking.

Figure 3B:
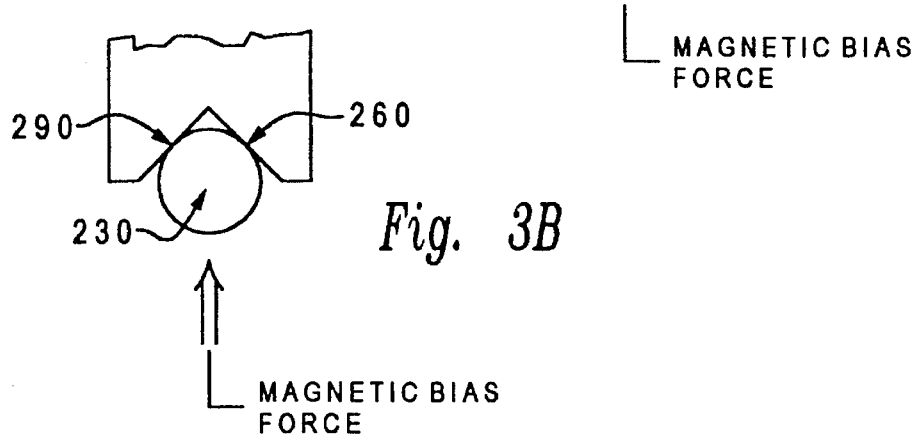
FIG. 3B shows the rotor pivot forced against the rotor mount bearing surfaces by the bias force created in the present invention.

The rotor pivot 230 is forced against bearing surface 260 by the attractive magnetic force created between rotor 210 and the rotor mount 220. Bearing surface 260 can be attached directly to rotor mount 220, or it can be placed on a different platform. As can better be seen in FIG. 3B, rotor pivot 230 is forced against bearing surfaces 260 and 290 by the attractive magnetic force. This constant bias force maintains pivot 230 solidly against the bearing surfaces 260 and 290. Although the bearing surfaces are shown to be straight to create a V-shape, it will be appreciated by those skilled in the art that the surfaces could be other shapes, curved for example, to create a working bearing surface. The V-slot, known by those skilled in the art as one type of a half bearing, restricts the motion of the rotor in a hemisphere of space. As seen in FIG. 3B, the V-slot restricts the motion of the rotor in any upward direction, but produces no restriction of the rotor in the downward direction.

The magnetic bias force produced is held in to a constant magnitude and direction by the present invention. The south pole of rotor 210 is placed directly over the center axis of rotor 210 or pivot 230. Because of the small angles of rotation Θ to which rotor 210 is subjected, the magnetic poles of rotor 210 remain oriented generally in the same direction relative to return path 220. Thus, the attractive force remains oriented, in the same direction, towards the top of the page in FIG. 3A and 3B, forcing pivot 230 against the bearing surfaces 260 and 290. Moreover, the unique shape of rotor 210 maintains a constant amplitude and direction of the magnetic force throughout the rotor 210 range of motion. As can best be seen in FIG. 2, the curvature of the top of rotor 210 keeps the surface of the rotor at a constant distance from the surface of the rotor mount 220 throughout the rotor range of motion Θ. Therefore, the bias gap 256 remains a constant shape and holds a constant reluctance. This produces a stable magnetic bias force vector throughout the range of rotation.

The present invention allows pivot 230 to rotate within bearing surface 260 and 290 without any wobble or vibration which would typically be present if conventional bearings were used. The usual jittering, wobbling, and bouncing is eliminated because variations in individual parts and manufacturing tolerances, normal wear of the pivot or bearings, and misalignment at assembly are all eliminated when the magnetically biased bearing of the present invention is used.

An additional feature may be included in the bearing design that prevents the rotor from falling out of the bearing surface in case there is a hard shock to the device. For example, this feature could be a locking hinge underneath the rotor pivot which restrains the pivot opposite to the bearing surface.

The preferred use of the present invention is such that the actuator and payload can fit into a space of approximately 1 cm×1 cm×1 cm and move a payload of approximately 1 gm through an angle of about ±3 degrees. The payload is mounted to the face of rotor 210. In order to rotate the payload, current is passed through coils 240 and 250 creating a magnetic field. By changing magnitude and polarity of the current to one coil or the other or both, rotor 210 can be rotated in one direction or the other over the typically small range defined by Θ. It is noted that none of this current is used for inducing an electromagnetic bias force. Thus, the use of a permanent magnet rotor design significantly reduces power consumption over the electromagnetic bias force design. All currents through the control coils 240 and 250 are used only to control the rotation of the rotor. This enables a more precise control of the rotor and allows for a higher frequency actuator because of the lower levels of current to be altered.

The invention is particularly well suited for miniature applications such as a fine tracking actuator for magneto-optic disk drives. Prior art systems required very small magnets to be attached to each armature. The small size of the device makes assembly and manufacture very costly and difficult. The present invention makes manufacturing less costly and easier by replacing four components with one. The permanent magnet rotor 210 can be injection molded or pressed and then magnetized in one piece. This simplifies manufacturing and reduces cost.

Figure 6:
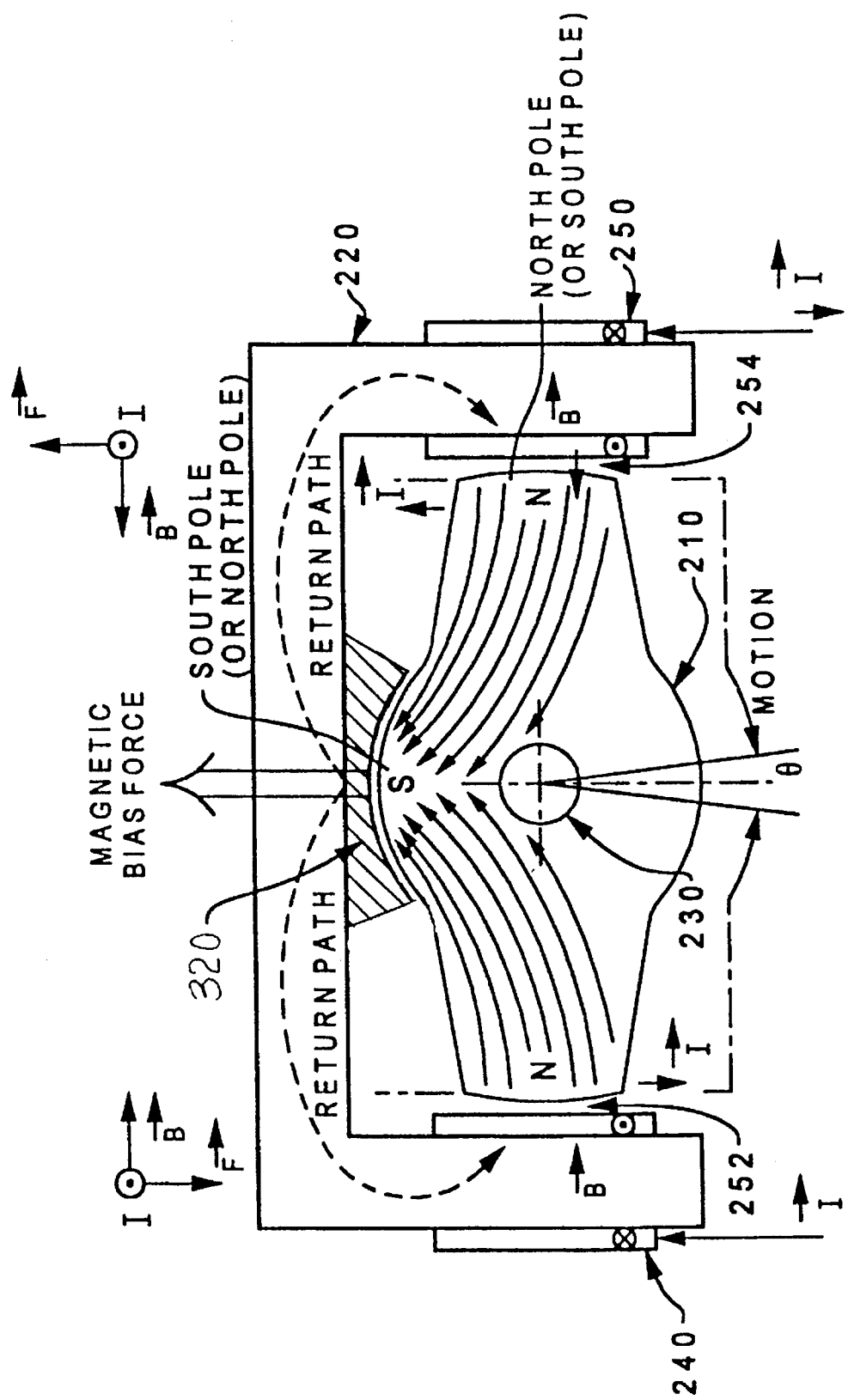
FIG. 6 shows a cut-away front view of the rotary actuator of the present invention, including a fillet.

In an alternative embodiment, magnetic circuit reluctance is improved between the rotor 210 and the return path 220 by adding a fillet to the return mount 220. The fillet 320 (in FIG. 6) would be shaped to fit bias gap 256 (in FIG. 2) in order to significantly reduce the bias gap distance and reluctance. The bias or working gap, which is the air gap between two elements of a magnetic circuit, is a significant factor in magnetic reluctance, and if large, it can reduce the attractive force created by the magnetic circuit. The fillet 320 will produce a stronger attractive force between rotor 210 and rotor mount 220. Another unique feature of the rotor shape is that the armatures of rotor 210 are slightly curved at their ends. This prevents detenting of the rotor with coils 240 and 250 or with rotor mount 220.

A prior art embodiment would be to place a magnet piece on top of rotor in order to create the magnetic flux between rotor and rotor mount. Although this configuration would provide a magnetically induced bias force on the rotor bearing, there are features with this embodiment which may be less desirable than the previously described construction. First, a permanent magnet must be incorporated in the movable element. Creating a rotor with an attached magnet, given the very small sizes of fine tracking actuators, is more susceptible to mechanical failure, and the additional weight increases power requirements and reduces bandwidth. This is especially important in the operation of a rotary actuator at high frequencies where high accelerations are created by a continual changing of direction by the rotary actuator. Second, the problems of manufacture seen with prior art devices that attach small magnets apply. Third, the glue interface between the magnets and the rotor creates a higher magnetic reluctance. This will reduce the strength of the bias force.

Figure 4:
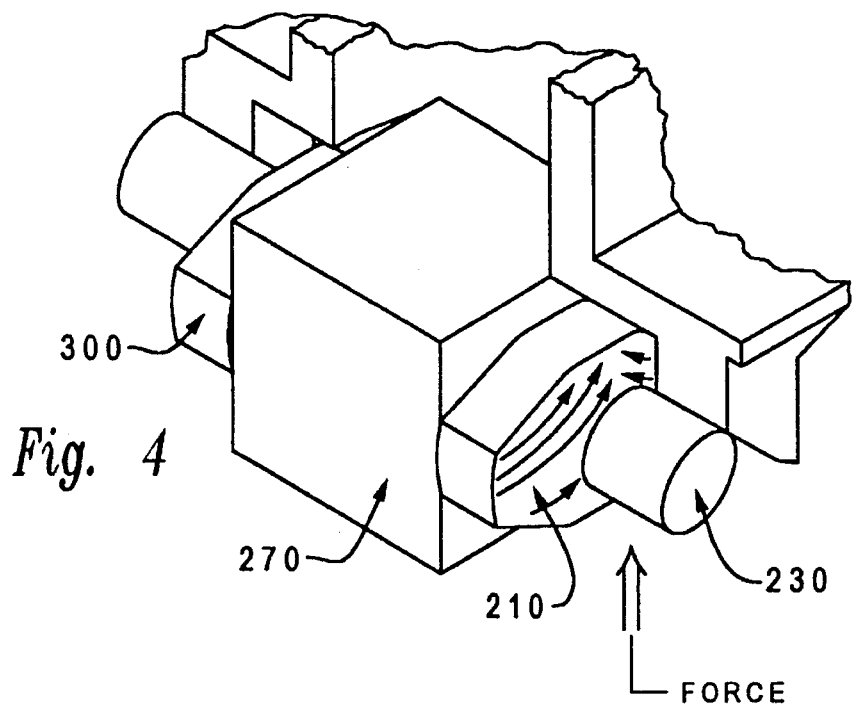
FIG. 4 depicts an alternative embodiment of the present invention utilizing two rotary actuators to carry a payload.

FIG. 4 shows a partial cutaway side view of an alternative embodiment of the present invention. Payload 270 is mounted between two rotors 210 and 300. This embodiment utilizes two rotary actuators operated in unison to rotate payload 270 over the small angle e. This configuration allows for a larger, heavier, or distinctly shaped payload to be rotated.

Figure 5:
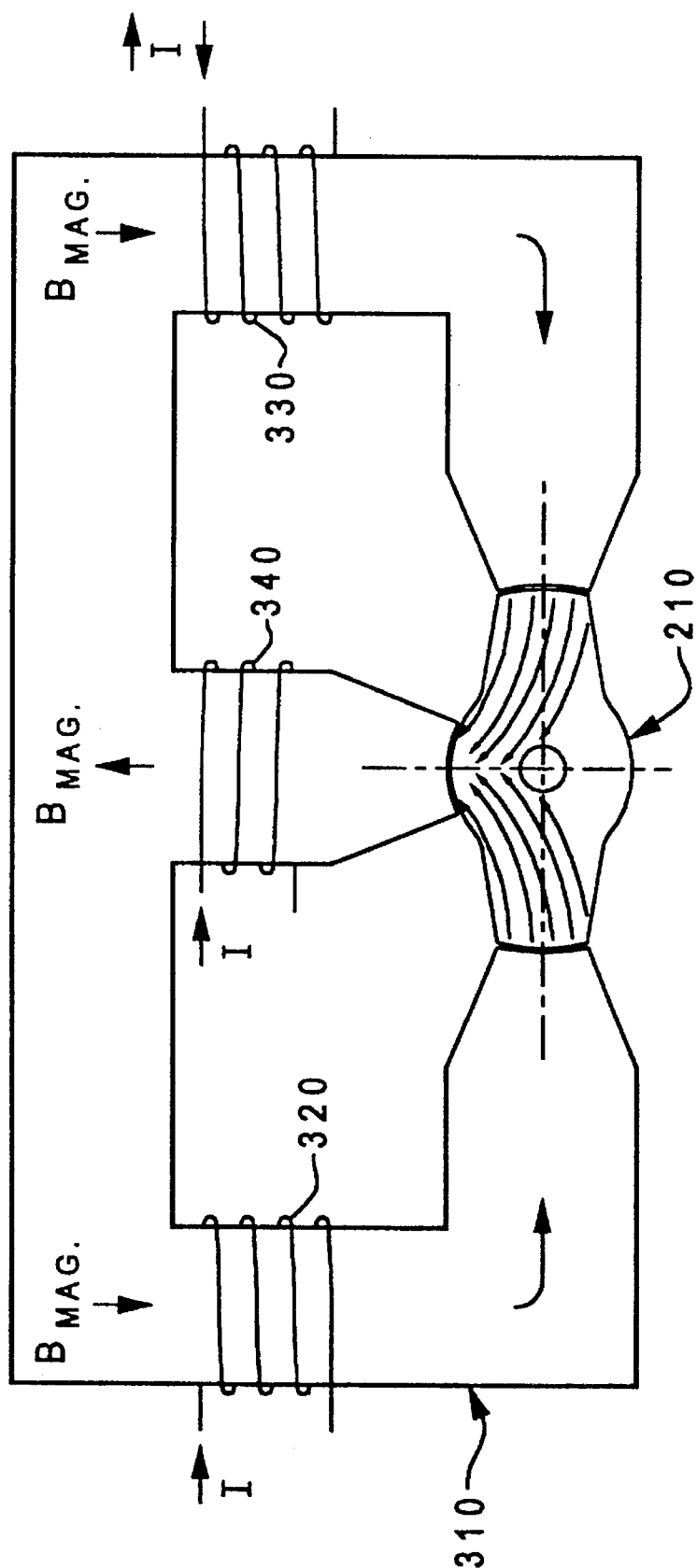
FIG. 5 illustrates a suggested method of magnetizing the actuator rotor of the present invention.

FIG. 5 illustrates a method of magnetizing rotor 210. After rotor 210 is formed by injection molding or pressing, the piece must be polarized to form a magnet. Rotor 210 is typically made of a permanent magnet material such as Alnico, ceramic, or Neodymium. Magnetizer 310 is made of a ferromagnetic material. Coils 320 and 330 are wrapped around the outer legs of magnetizer 310 in a clockwise manner. Coil 340 is wrapped around the center leg in a counter-clockwise direction. When current flows through the coils, an electromagnetic flux is created in the three legs. The magnetic flux polarizes the material of rotor 210 and creates a north-south polarity from the armatures to the top of rotor 210. This device facilitates a simple and efficient magnetization of rotor 210.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A rotary actuator having a magnetically biased bearing, comprising:

a magnetic rotor having a body and a first and a second armature extending from the body, the magnetic rotor being rotatable about an axis, and being formed as a single integral permanent magnet magnetized with a first pole and second pole of one polarity located at an end of the first and second armatures, respectively, and a third pole of opposite polarity located at a top of the body;

a ferromagnetic return-path placed in close proximity to the magnetic rotor such that a magnetic flux path connecting the third pole to the first and second poles is created, wherein magnetic flux runs through a first flux path between the third pole and the first pole, and magnetic flux runs through a second flux path between the third pole and the second pole, a continuous and substantially constant magnetic bias force being created by the first and second flux paths which attracts the magnetic rotor to the ferromagnetic return-path;

a pivot arm of a selected circumference, fixedly attached to the magnetic rotor, coaxial with the axis; and a bearing surface surrounding less than the entire circumference of the pivot arm and aligned with the ferromagnetic return-path such that the magnetic bias force holds the pivot arm in tight contact with the half bearing surface, whereby the rotor maintains an accurate and controlled rotation;

wherein the combination of the magnetic rotor and ferromagnetic return-path generates a magnetic bias force that, in combination with the pivot arm being forced against the bearing surface by the magnetic bias force, defines the magnetically biased bearing.

2. A rotary actuator according to claim 1, further comprising at least one coil wound around the first flux path and at least one coil wound around the second flux path, whereby an electromagnetic flux may be introduced into either magnetic flux path.

3. A rotary actuator according to claim 1, wherein the return-path comprises a frame member made of a ferromagnetic material and which acts as a mount for the bearing surface, the frame member providing a mount for the rotary actuator.

4. A rotary actuator according to claim 1, wherein the magnetic rotor has a curvature at its top aligned with the rotor center axis, whereby the bias force remains constant throughout the rotor's range of motion.

5. A rotary actuator, according to claim 4, wherein the return-path has a surface shaped to complement the curvature at the top of the rotor for reducing the reluctance of the return-path.

6. A rotary actuator according to claim 4, wherein each armature has a length greater than the distance from the axis to the curvature.

7. A rotary actuator according to claim 1, further comprising an optical element mounted on the rotary actuator.

8. A rotary actuator according to claim 1, wherein the armatures have curved ends.

9. A rotary actuator according to claim 1, wherein the rotor is molded as one homogenous piece.

10. A rotary actuator according to claim 1, wherein the half bearing is a V-slot.

11. A rotary actuator according to claim 1, wherein the half bearing restricts the movement of the rotor in no more than a single hemisphere.

12. An optical data storage system comprising:
a means for receiving an optical data storage disk;
a means for rotating the optical data storage disk;
a radiation generation means for producing a radiation beam;
a radiation transmission means for transmitting the radiation beam to the disk, the transmission means including an optical head with an objective lens for focussing the radiation beam to the disk, a first movement means for moving the optical head in a radial direction relative to the disk, and a second movement means for moving the objective lens in a direction perpendicular to the surface of the disk;
a magnetic rotor having a body and a first and a second armature extending from the body, the magnetic rotor being rotatable about an axis, and being formed as a single integral permanent magnet magnetized with a first pole and second pole of one polarity located at an end of the first and second armatures, respectively, and a third pole of opposite polarity located at a top of the body;
a ferromagnetic return-path placed in close proximity to the magnetic rotor such that a magnetic flux path connecting the third pole to the first and second poles is created, wherein magnetic flux runs through a first flux path between the third pole and the first pole, and magnetic flux runs through a second flux path between the third pole and the second pole, a continuous and substantially constant magnetic bias force being created by the first and second flux paths which attracts the magnetic rotor to the ferromagnetic return-path;
a pivot arm, fixedly attached to the magnetic rotor, coaxial with the axis;
a half bearing surface being in contact with the pivot arm and aligned with the ferromagnetic return-path such that the magnetic bias force holds the pivot arm in tight contact with the half bearing surface, whereby the rotor maintains an accurate and controlled rotation; and
a radiation reception means for receiving a reflected radiation beam from the disk and generating a data signal responsive thereto;
wherein the combination of the magnetic rotor and ferromagnetic return-path generates a magnetic bias force that, in combination with the pivot arm being forced against the half bearing surface by the magnetic bias force, defines the magnetically biased bearing.

13. An optical data storage system according to claim 12, further comprising at least one coil wound around the first flux path and at least one coil wound around the second flux path, whereby an electromagnetic flux may be introduced into either magnetic flux path.

14. An optical data storage system according to claim 12, wherein the return-path comprises a frame member made of a ferromagnetic material and which acts as a mount for the bearing surface, the frame member providing a mount for the rotary actuator.

15. An optical data storage system according to claim 12, further comprising an optical element mounted on the rotary actuator.

16. An optical data storage system according to claim 12, wherein the armatures have curved ends.

17. An optical data storage system according to claim 12, wherein the return-path has a surface shaped to complement the curvature at the top of the rotor for reducing the reluctance of the return-path.

18. An optical data storage system according to claim 12, wherein the magnetic rotor has a curvature at its top aligned with the axis so that the bias force remains constant throughout the rotor's range of motion, and wherein each armature has a length greater than the distance from the axis to the curvature.

19. An optical data storage system according to claim 12, wherein the rotor is molded as one homogenous piece.

20. An optical data storage system according to claim 12, wherein the half bearing is a V-slot.

21. An optical data storage system according to claim 12, wherein the half bearing restricts the movement of the rotor in no more than a single hemisphere.

22. A rotary actuator comprising:
a magnetic rotor having a body, a pivot arm and a first and a second armature extending from the body, the magnetic rotor being rotatable about an axis through the pivot arm and being magnetized with a first and second pole of one polarity located at an end of the first and second armatures, respectively, and a third pole of opposite polarity located at a top of the body; and
a magnetically biased bearing for maintaining the magnetic rotor within an accurate and controlled rotation, the magnetically biased bearing including a magnetic circuit and a bearing surface, the magnetic circuit being formed by a ferromagnetic return-path placed in close proximity to the magnetic rotor such that a first magnetic flux path is created through the ferromagnetic return-path and magnetic rotor connecting the third pole to the first pole and a second magnetic flux path is created through the ferromagnetic return-path and the magnetic rotor connecting the third pole to the second pole, wherein a continuous magnetic bias force of a constant magnitude and direction is created by the magnetic circuit that attracts the magnetic rotor to the ferromagnetic return-path, and wherein the bearing surface is aligned with the ferromagnetic return-path such that the magnetic bias force holds the pivot arm of the magnetic rotor in tight contact with the bearing surface to restrict all motion of the magnetic rotor to rotation.

23. A rotary actuator according to claim 22, further comprising at least one coil wound around the first flux path and at least one coil wound around the second flux path, whereby an electromagnetic flux may be introduced into either magnetic flux path.

24. A rotary actuator according to claim 22, wherein the return-path comprises a frame member made of a ferromagnetic material and which acts as a mount for the bearing surface, the frame member providing a mount for the rotary actuator.

25. A rotary actuator according to claim 22, wherein the magnetic rotor has a curvature at its top aligned with the rotor center axis.

26. A rotary actuator according to claim 25, wherein the return-path has a surface shaped to complement the curvature at the top of the rotor for reducing the reluctance of the return-path.

27. A rotary actuator according to claim 22, further comprising an optical element mounted on the rotary actuator.

28. A rotary actuator according to claim 22, wherein the armatures have curved ends.

* * * * *